United States Patent [19]
Tomek

[11] 3,753,090
[45] Aug. 14, 1973

[54] COMBINATION FLASHLIGHT AND CONTINUITY TESTER HAVING HINGED CONTACT

[76] Inventor: Harry P. Tomek, 4524 Tennessee, St. Louis, Mo. 63111

[22] Filed: Mar. 7, 1972

[21] Appl. No.: 232,486

[52] U.S. Cl. .............................. 324/53, 240/10.6 R
[51] Int. Cl. ............................................. G01r 31/02
[58] Field of Search ................. 324/53; 240/10.6 R, 240/10.66

[56] References Cited
UNITED STATES PATENTS

| | | | |
|---|---|---|---|
| 2,174,484 | 9/1939 | Wassel | 324/53 |
| 2,231,660 | 2/1941 | Carlotti et al. | 324/53 |
| 2,324,661 | 7/1943 | Woodington | 324/53 |
| 2,681,433 | 6/1954 | Palmer | 324/53 |
| 2,703,385 | 3/1955 | Curd | 324/53 |
| 2,839,724 | 6/1958 | Chandler et al. | 324/53 |
| 3,497,798 | 2/1970 | Schick | 324/53 |

FOREIGN PATENTS OR APPLICATIONS

587,036   4/1947   Great Britain ......................... 324/53

Primary Examiner—Gerard R. Strecker
Attorney—Philip B. Polster and J. Philip Polster

[57] ABSTRACT

A common flashlight is adapted to either a normal portable lighting function or to use as a continuity tester. Two electrical conductors, used externally, serve as continuity test probes. One of these conductors is electrically connected through the flashlight bulb to one side of the battery supply. The second conductor is electrically connected to a second side of the battery supply. Continuity is checked by touching the probes to the circuit to be tested. The bulb glows when the circuit is continuous.

1 Claim, 9 Drawing Figures

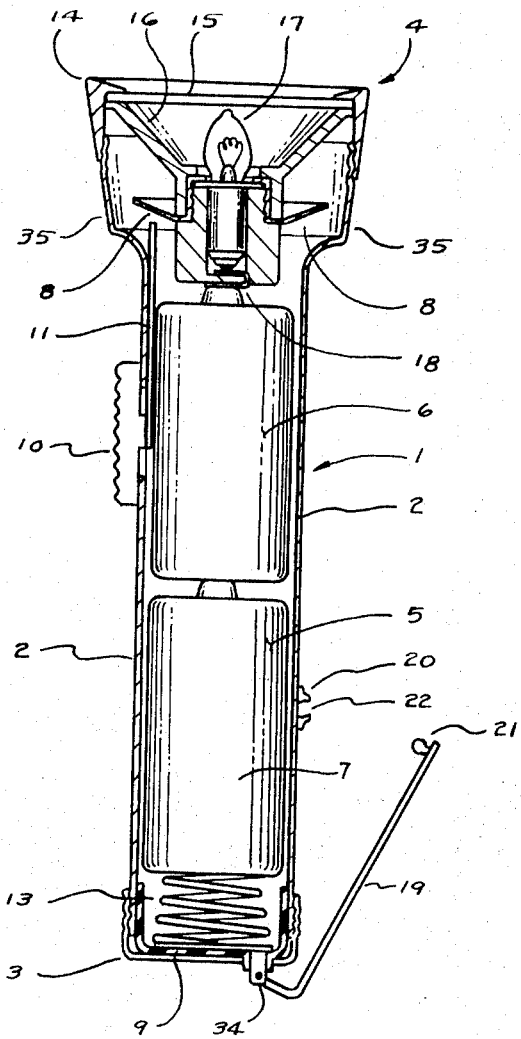
Fig -1-
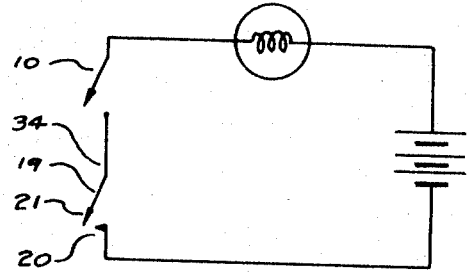
Fig -2-

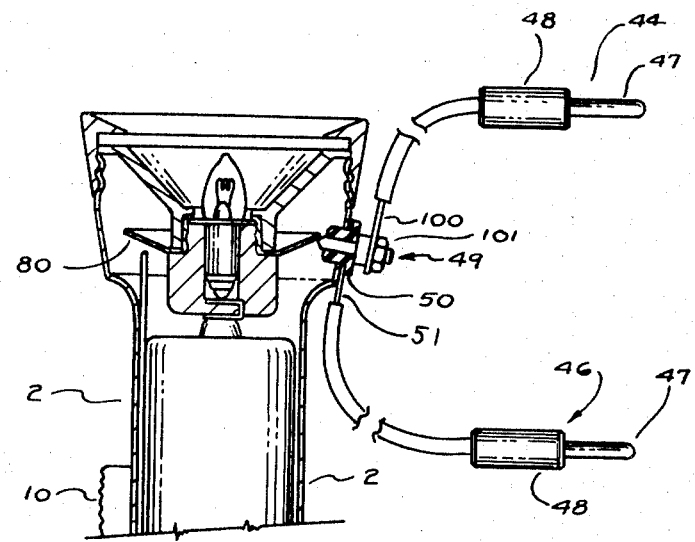
Fig-3-
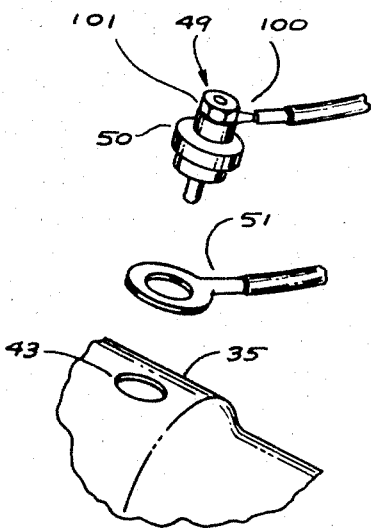
Fig-4-

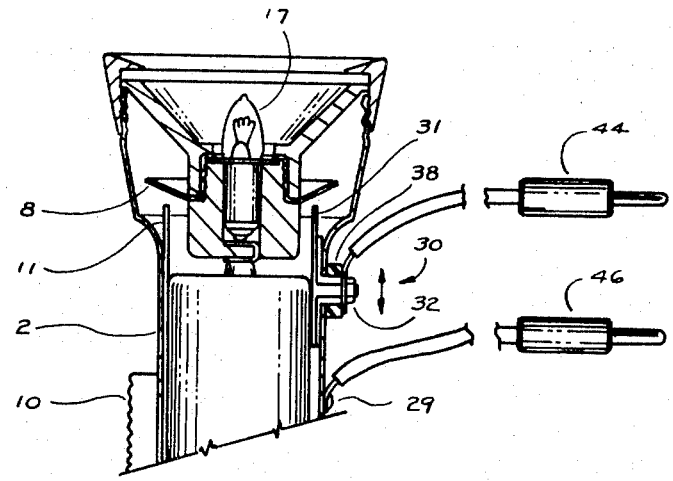
Fig-5-
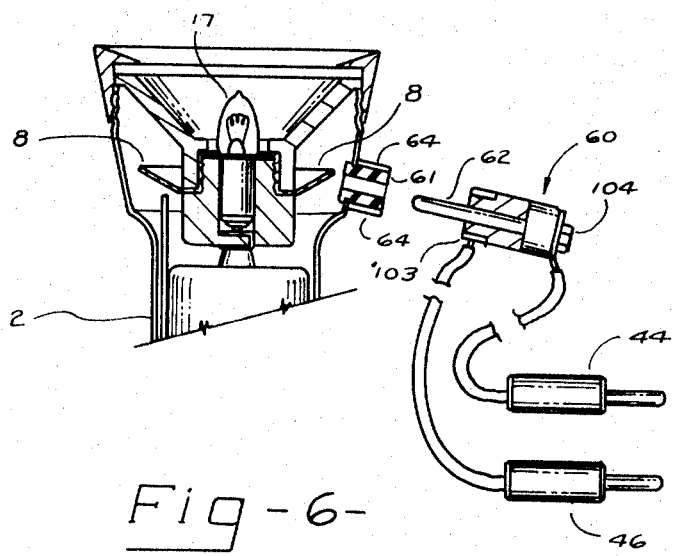
Fig-6-

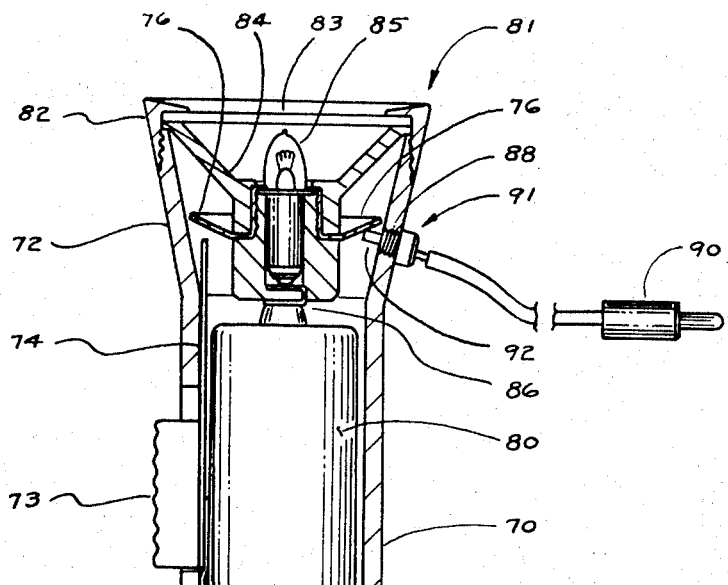
Fig-7-
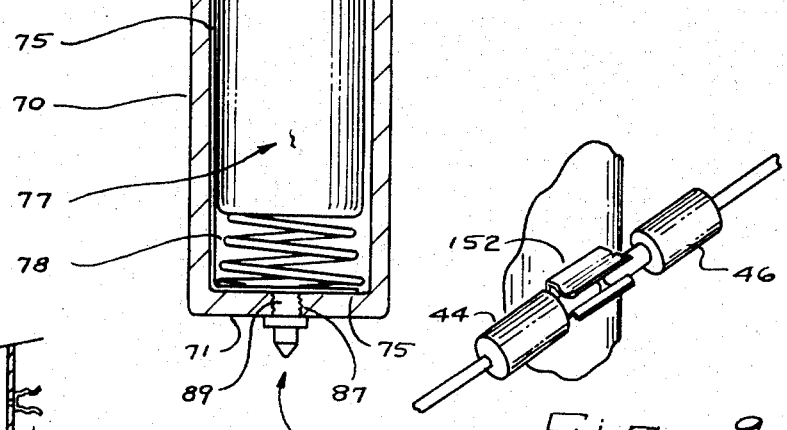
Fig-9-
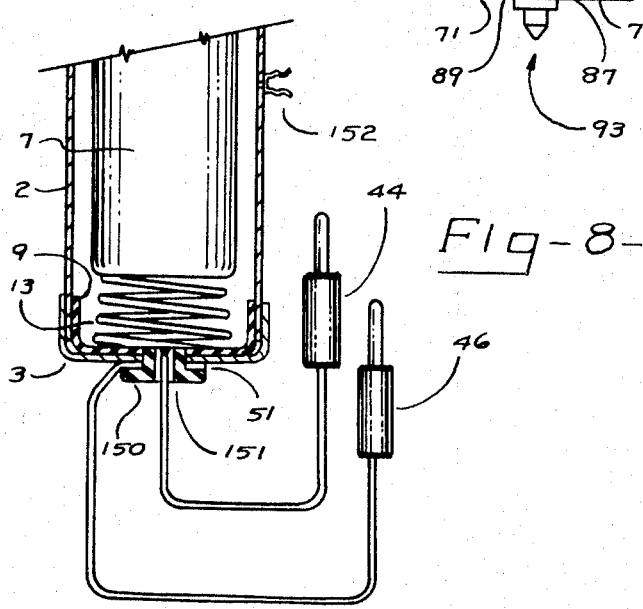
Fig-8-

COMBINATION FLASHLIGHT AND CONTINUITY TESTER HAVING HINGED CONTACT

BACKGROUND OF THE INVENTION

This invention relates to an improvement for a common flashlight and in particular to the conversion of the common flashlight to a continuity tester.

In general repair work, the need for a convenient, accessible continuity tester is apparent. Such a device is invaluable for checking defects in electrical appliances, electric motors, fuses and other electrical circuits in which a short circuit or a break in the circuit may occur. While continuity testers are old in the art and work well for their intended purposes, the more common types are not intended to be carried by the user continually. This invention provides means for converting the common flashlight into a continuity tester. Defects may be checked whenever the battery voltage is sufficient to provide current flow in a continuous circuit. Even where electrical loss exceeds battery voltage capability, however, sections of the circuit, for example, fuses or lead wires, may be checked successfully. Usually, a flashlight is available during the repair of devices where this invention is useful, and in many instances is carried by or attached to the belt of the user.

The more popular commercial flashlights are, broadly speaking, of two types, one using an insulating tube for the batteries and a distinct electrical circuit, and the other using the flashlight enclosure proper as a part of the electrical circuit. Plastic encased flashlights, a variation of the first type above, are also available. My invention is adaptable to all types. This invention also is adaptable to other electrical circuits utilizing light bulbs, powered by either A.C. or D.C. voltage.

One of the objects of this invention is to provide an easy to manufacture, low cost continuity tester and flashlight combination.

Another object of this invention is to provide a continuity tester that may be carried by the user continually.

Still another object of this invention is to provide means to convert a common flashlight into a continuity tester.

Other objects will become apparent to those skilled in the art in light of the following description and accompanying drawings.

SUMMARY OF THE INVENTION

In accordance with this invention, generally stated, a combination flashlight and continuity tester is provided by electrically connecting the flashlight bulb between the battery supply and one probe of a continuity tester and electrically connecting a second probe to the opposite side of the flashlight battery supply. Simple mechanisms are provided in order to convert to a flashlight or continuity function alternately.

BRIEF DESCRIPTION OF THE DRAWINGS

In the drawings,

FIG. 1 is a sectional view of one illustrative embodiment of flashlight-continuity tester of this invention;

FIG. 2 is a diagrammatic representation of the electrical circuit of flashlight-continuity tester of FIG. 1;

FIG. 3 is a fragmentary sectional view of a second illustrative embodiment of flashlight-continuity tester of this invention;

FIG. 4 is a fragmentary exploded view of parts of the illustrative embodiment of flashlight-continuity tester shown in FIG. 3;

FIG. 5 is a fragmentary view, partly in section of a third illustrative embodiment of flashlight-continuity tester of this invention;

FIG. 6 is a fragmentary exploded view, partly in section, showing still another illustrative embodiment of device of this invention;

FIG. 7 is a sectional view of a fifth illustrative embodiment of flashlight-continuity tester of this invention;

FIG. 8 is a fragmentary view, partly in section, showing yet another embodiment of flashlight-continuity tester of this invention; and FIG. 9 is an enlarged view in perspective of the retaining clip shown in FIG. 8.

DESCRIPTION OF THE PREFERRED EMBODIMENT

Referring now to FIG. 1 for one illustrative embodiment of flashlight-continuity tester of this invention, reference numeral 1 indicates a flashlight having an open ended, cylindrical body section 2. Section 2 is closed at one end by a bottom cap 3 and has a flared second end 35. End 35 is closed by a lamp group 4. As is conventional, bottom cap 3 and lamp group 4 are mounted removably to body section 2 by a thread type arrangement between the body section, cap and lamp group. Body section 2 serves as a handle for the flashlight in the area delimited by cap 3 and flared end 35.

Flashlight 1 encloses a battery supply 5 having batteries 6 and 7 as the source of electrical energy, and a lamp housing 8. Bottom cap 3 and lamp group 4 are removed from body section 2 when access to the battery supply 5 or lamp housing 8, respectively, is desired.

Body section 2 has an opening in it near the center of its length, and a switch assembly 10 is inserted therein. Switch assembly 10 is conventionally mounted in a slidable fit with body section 2. In the embodiment of FIG. 1, body section 2 conducts electrically. A strip conductor 11 is electrically connected to body section 2 through switch 10 and is movable therewith. Physical and electrical contact is made and broken alternately between conductor 11 and lamp housing 8 as switch 10 is moved manually toward and away from the lamp end of the flashlight. This is conventional.

In the prior art, a conductive spring 13 completed the electrical circuit between switch 10 and the negative side of the battery source by electrically connecting the battery source to the body section through the bottom cap 3. Such connection is prevented in FIG. 1 by the use of a non-conductive, insulative washer 9 interposed in cap 3 between the cap and spring 13 as may be readily seen by reference to FIG. 1. Thus, the circuit normally existing between the switch 10 and spring 13 is broken. The insulative function of washer 9 may be accomplished by other types of insulators or by a different type construction in cap 3. For example, the cap may be made of a non-conductive material, and plastic works well. Cap 3 is shown in FIG. 1 with a diameter larger than body section 2. However, cap 3 may be constructed with a diameter smaller than body section 2 thereby eliminating the need for a U-shaped washer or, any washer at all when cap 3 is constructed of an insulative material. The U-shape of washer 9 effectively prevents spring 13 from coming into contact with body section 2.

Lamp group 4 has a removable enclosure 14, and contains a lens 15, a light reflector 16, a light bulb 17, and lamp housing 8, arranged in a conventional manner. In the embodiment of FIG. 1, lamp housing 8 is electrically conductive and makes the circuit between switch assembly 10, when that switch is in its closed or "on" position, and one side of bulb 17. A second side of bulb 17 is electrically connected to the positive terminal of battery 6 through a bulb base 18.

The flashlight as thus described, with the exception of washer 9, is conventional and well-known in the prior art, although the switch assembly, enclosure design, and shape of body section 2 have differed from make to make in commercially available flashlights.

Because of the insertion of insulative washer 9, the electric circuit of the flashlight is not completed by mere operation of switch 10. An electrically conductive strip 19 terminates at one end in a ball 21 and is attached to cap 3 at its second end. Conductive strip 19 may be a simple, flexible electric wire or, as shown in FIG. 1, a solid, stiff bar-like electrical conductor. In either case, it is terminated at cap 3 by a connection 34. In the embodiment shown in FIG. 1, connection 34 is a hinged connection and conductive strip 19 is a bar type conductor. Such hinged connection allows movement of conductor 19. The connection 34 projects through cap 3, from which it is electrically insulated, and is electrically connected to the conductive spring 13. The conductive spring 13 is in electrical contact with the negative side of battery 7.

A receiver 20 with a socket 22 is fixed mechanically and electrically to body section 2 in a complementary position relative to conductive strip 19 so that the ball end 21 of strip 19 may be inserted and disengaged from receiver 20 intentionally by the user of the device. A conventional snap fastener works well for this purpose. With ball 21 engaged in receiver 20, body section 2 is once again conductive as may be seen by reference to FIG. 2. When so engaged, the device functions as a normal flashlight, controllable by switch 10.

Conversion to a continuity tester is easy and accomplished by disengagement of the ball 21 and socket 22 while switch 10 is in its "on" position. Ball 21 and socket 22 thereby become the test probes for continuity testing as each is electrically connected to one of the opposite sides of battery supply 5. The circuit to be checked is placed between the probes and if continuous, the electrical circuit is completed and light bulb 17 relights. Attachment of the ball and socket arrangement of conductor 19 converts the device back to its flashlight function.

The embodiment shown in FIG. 3 is a variation of the principle of my invention. The flashlight shown is conventional and similar to that of FIG. 1 except that washer 9 is not inserted into cap 3, and therefore body section 2 is conductive. The flared end 35 of body section 2 has a drilled opening 43 through its thickness, as may best be seen in FIG. 4. This opening is important for the continuity testing function of the apparatus. Continuity testing is accomplished through the use of a pair of probes 44 and 46. Probes 44 and 46 are of standard construction and each has a contact section 47 and a handle area 48. Probe 44 is terminated at a connector 100 which is fastened to a jack 49 by a lock nut 101, thereby forming a single unit. Jack 49 is surrounded by a bushing 50, which may be constructed from various insulative materials. For example, resilient rubber functions well for both insulation value and as a method of attaching jack 49 to body section 2. Probe 46 terminates at a circular connector 51. Bushing 50 is constructed so that it fits through connector 51. By placing bushing 50 through connector 51 and then inserting the bushing into opening 43, the continuity portion for this flashlight embodiment is completed. Jack 49 is sufficient in length so that it is in physical and electrical contact with lamp housing 8. In the position shown in FIG. 3, connector 51 is grounded to body section 2 and insulated from probe 44 by bushing 50. The resilient nature of bushing 50 creates a tight fit with the material thickness of body section 2.

Various other connections may be made in flashlights in which the body section is conductive, and two such further variations are demonstrated in FIGS. 5 and 6.

Referring to FIG. 5, probe 46 is electrically connected to body section 2 at a point 29, such connection being made by any convenient method, for example, either a weld or rivet works well. This connection places probe 46 in electrical contact with the negative side of battery supply 5. Probe 44 is electrically connected to one side of a switch 30. Switch 30 operates similar to the standard switch 10 of the flashlight function in that it is slidably mounted on body section 2 and has a second side conductor 31 which alternately makes and breaks electrical and physical contact with lamp housing 8. Switch 30 has a terminal post 32 to which probe 44 is electrically connected, which in turn is electrically connected to conductor 31. Switch 30 is insulated from the conductive body section 2 in a manner normally associated with switches for flashlights of this type and such method of insulation does not comprise a part of the present invention. For example, use of a plastic slide 38 around post 32 and between conductor 30 and body section 2 will keep the parts insulated effectively. Both switch 10 and switch 30 are shown in their open position in FIG. 5, and conversion from one function to another consists of merely closing the electric switch so that either conductor 11 or conductor 31 comes in contact with lamp housing 8. In the flashlight function, the light 17 will go on with such closing, while in the continuity function closing places the probe into the electrical circuit after which continuity is checked in the manner described above.

The device illustrated in FIG. 6 is a further variation for use with the flashlight type illustrated in the previous embodiments, that is, where the body section is conductive. In FIG. 6, probe 44 is electrically connected to a plug-in jack 60 of standard construction, commonly used in electrical applications. Jack 60 has a ground side 103 and a conductive side 104 electrically insulated from one another. Probe 46 is electrically connected to the external or ground side 103 and probe 44 is electrically connected to the conductibe side 104 of jack 60. A receptacle 61 fits through opening 43 and is attached to body section 2 by any convenient method. A tight friction fit is satisfactory. A male extension 62 of Jack 60 extends through a receptacle 61 and makes electrical contact with lamp housing 8. A shield 64 of receptacle 61 is electrically conductive and is grounded to body section 2. As jack 60 is plugged in, ground side 103 of the jack makes electrical contact with shield 64 thereby connecting probe 46 to the negative side of the battery supply, while probe 44 is electrically connected through jack 60, housing 8, and bulb 17 to the positive side of that battery supply. In this embodiment, receptacle 61 is permanently fixed in the flashlight while probes 44 and 46 are carried separately. Conversion to the flashlight function is accomplished by the unplugging of jack 60.

Flashlights in which the body section is not conductive are also adaptable to this invention and one such embodiment is illustrated in FIG. 7. The flashlight there shown has a body section 70 constructed of a non-conductive material, commonly plastic. Body section 70 is cylindrical in shape and has a bottom wall 71 and a flared, open end 72. Body section 70 has an opening in it and a switch 73 is inserted therein in a normal manner, the switch conventionally having a strip conductor 74 as its conductive element. Conductor 74 makes and breaks electrical contact with a lamp housing 76 and is slidably engaged with a conductor 75. Conductor 75 is L-shaped in side elevation and connects switch 73 to the negative side of a battery supply 77, through a conductive spring 78. Spring 78, in addition to its conductive properties, insures electrical contact between a battery 79 and a battery 80 of supply 77.

Flared end 72 of body section 70 is closed by a lamp group 81 having an enclosure 82, a lens 83, a reflector 84, lamp housing 76, and a bulb 85. One side of bulb 85 is electrically connected to lamp housing 76 and the second side is electrically connected, through a base 86, to the positive side of supply 77.

The conventional flashlight as thus described is modified so that the walls of the body section define two openings, a point contact opening 87 in bottom wall 71, and a receiver opening 88 in flared end 72. Both openings may be threaded and may be cast integrally with section 70 or tapped in a separate operation.

Point contact opening 87 receives a probe 93 in such a manner as to allow a base section 89 to make electrical and physical contact with the short leg of L-shaped conductor 75, and thus is electrically connected to the negative side of battery 79 through spring 78.

A probe 90 is conventional in design and is electrically connected to a jack 91. Jack 91 is placed in opening 88 of flared end 72, and a male member 92 is sufficient in length so as to establish electrical contact with lamp housing 76. Once the probes are in place, continuity is checked in the manner described above.

The apparatus illustrated in FIG. 8 combines features of my invention in yet another embodiment. The battery arrangement, switch 10 and lamp group 4 remain the same as described ib FIG. 1. Washer 9 and cap 3 have been modified so that each have openings in them. The openings are sized to receive a grommet 150. Grommet 150 has an axial channel 151 in it, which permits passage of probe 44, and is constructed from electrically insulative material. Probe 44 is electrically connected to battery 7 through spring 13.

Probe 46 terminates at connector 51, similar to the termination shown in FIG. 4, and is frictionally held against cap 3 by grommet 150. Probe 44 is in electrical contact with one side of the battery supply, while probe 46 is electrically connected to body section 2 and the battery is insulated from electrical contact with the body section. A conductive clip 152 is provided and holds the probes while the apparatus is utilized as a flashlight. Probe 44 must be inserted in clip 152 as it completes the electrical circuit for flashlight operation. Switch 10 remains in its "on" position during continuity testing and conversion to such use is accomplished by simply removing both probes from clip 152. Continuity is checked in the manner described above.

Numerous variations in the construction of the apparatus of this invention, within the scope of the appended claims may be made. Thus, the design of the probes may be varied. Simple electrically insulated wire works well for the probes described herein. Various common jacks and connectors may be substituted for those described herein. The number of batteries used in the flashlight may be varied or the shape of the body section may be changed. The principle may even be applied to emergency cord socket-handles. The variations are merely illustrative.

I claim:

1. In a combination flashlight and testing device comprising an elongated casing, a switch mounted on said casing, a battery supply within said casing electrically connected mediately to a first side of said switch, and an electric bulb, mounted on said casing at one end and connected between a second side of said switch and one electrical side of said battery supply; closure means for closing an end of said casing opposite the said bulb, and an electrically conductive spring compressively trapped between said closure means and the other electrical side of said battery supply, the improvement comprising a hinge leg electrically connected to said spring and projecting outwardly through said closure in electrically insulative relation thereto, an L-shaped bar-like conductor having a short leg and a long leg, the said short leg being hingedly mounted to the outwardly projecting end of said hinge leg, a snap socket mounted on said casing and electrically connected to said first side of said switch, an electrically conductive ball mounted on the side of the long leg of said bar-like conductor adjacent the casing, said ball being shaped and positioned complementarily to said socket whereby when said conductor is rotated about the said hinge to one position the ball is seated securely but manually demountably in said socket, a circuit through said spring, hinge leg, bar-like conductor, ball, and socket constituting the sole electrical connection between said other electrical side of said battery supply and said first side of said switch.

* * * * *